Jan. 25, 1955
R. O. MAYES
2,700,388
CORN SHELLING AND MEASURING DEVICE
Filed June 19, 1953
5 Sheets-Sheet 3
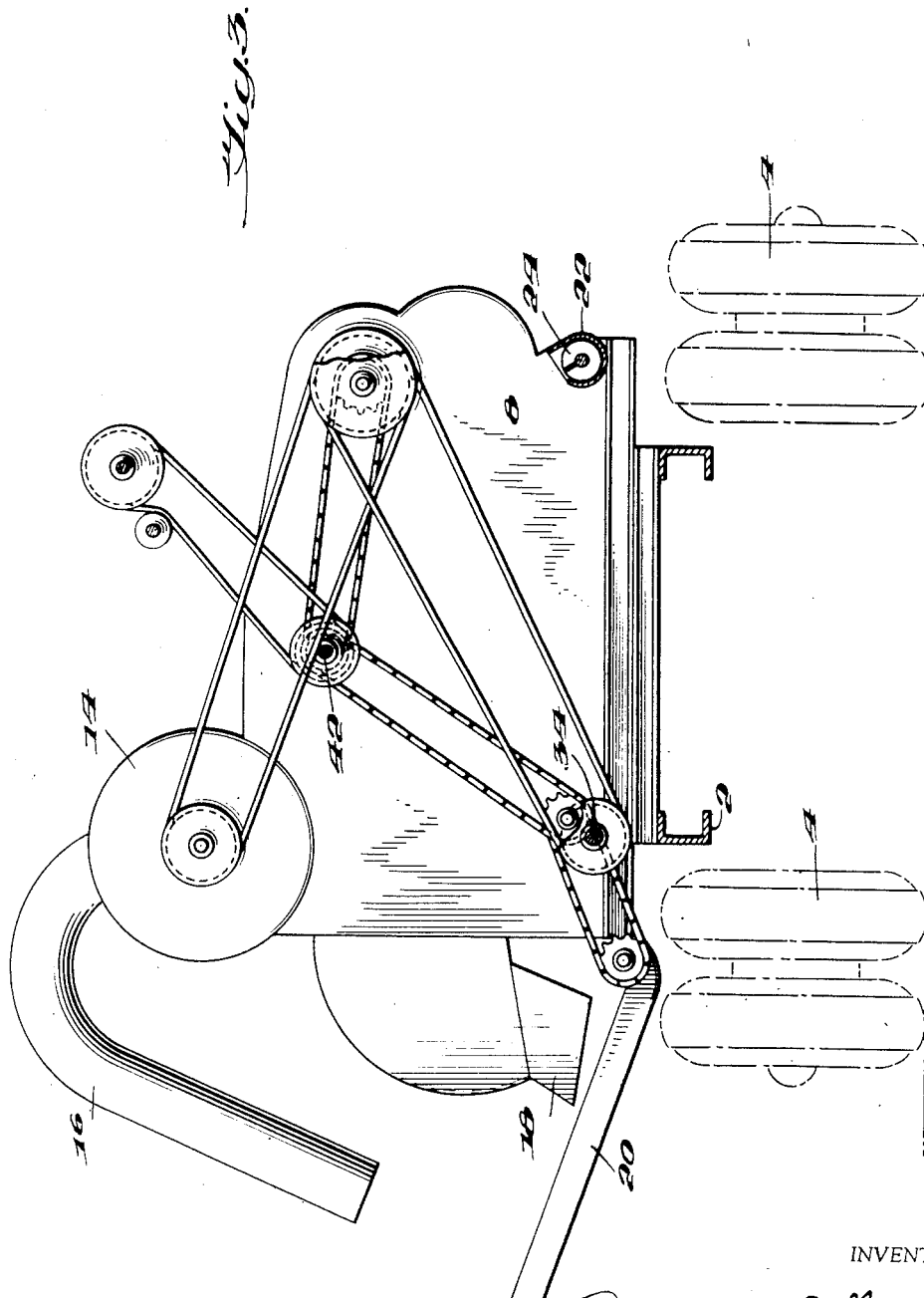
INVENTOR
Raymond O. Mayes
BY Bailey, Stephens & Huettig
ATTORNEYS Jan. 25, 1955
R. O. MAYES
2,700,388
CORN SHELLING AND MEASURING DEVICE
Filed June 19, 1953
5 Sheets-Sheet 4
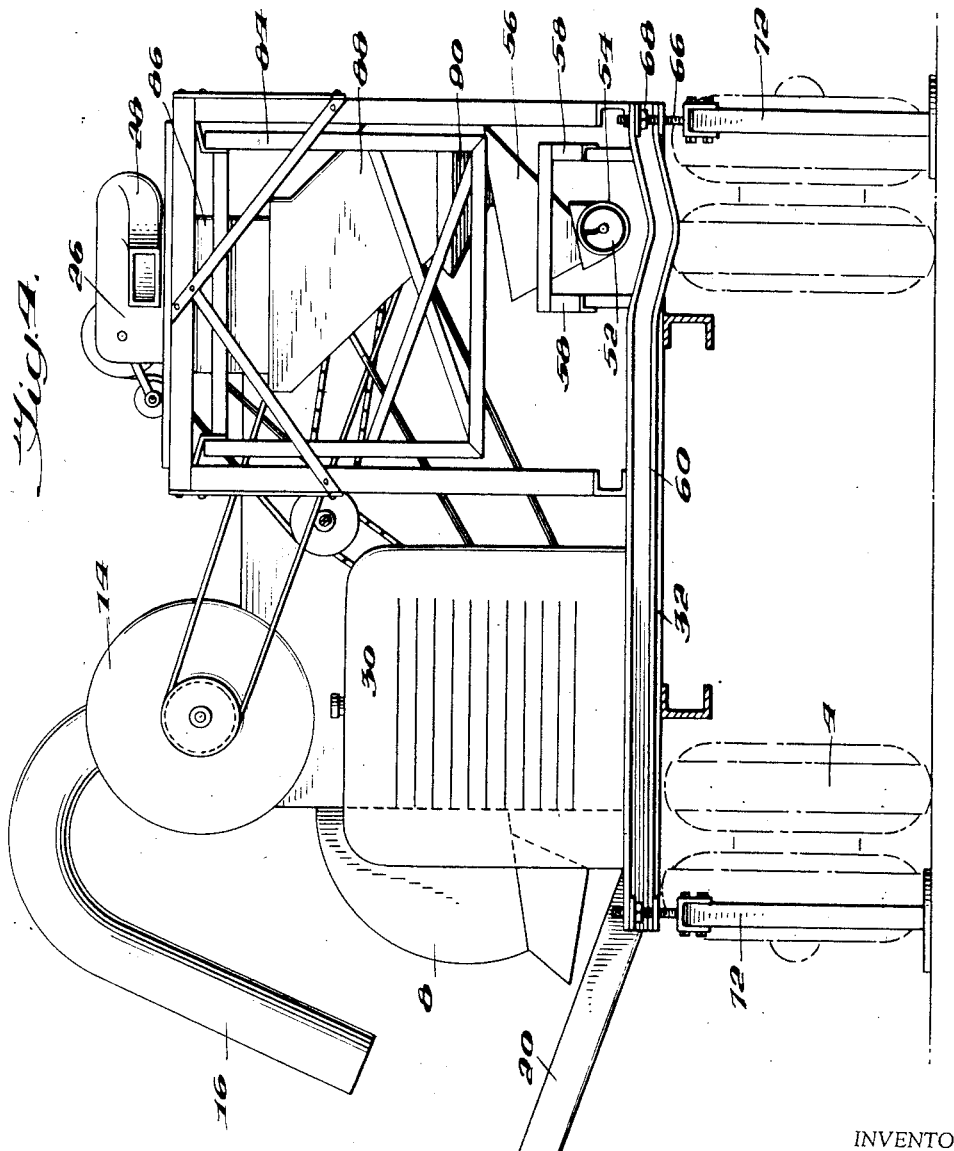
INVENTOR
Raymond O. Mayes
BY Bailey, Stephens + Huettig
ATTORNEYS

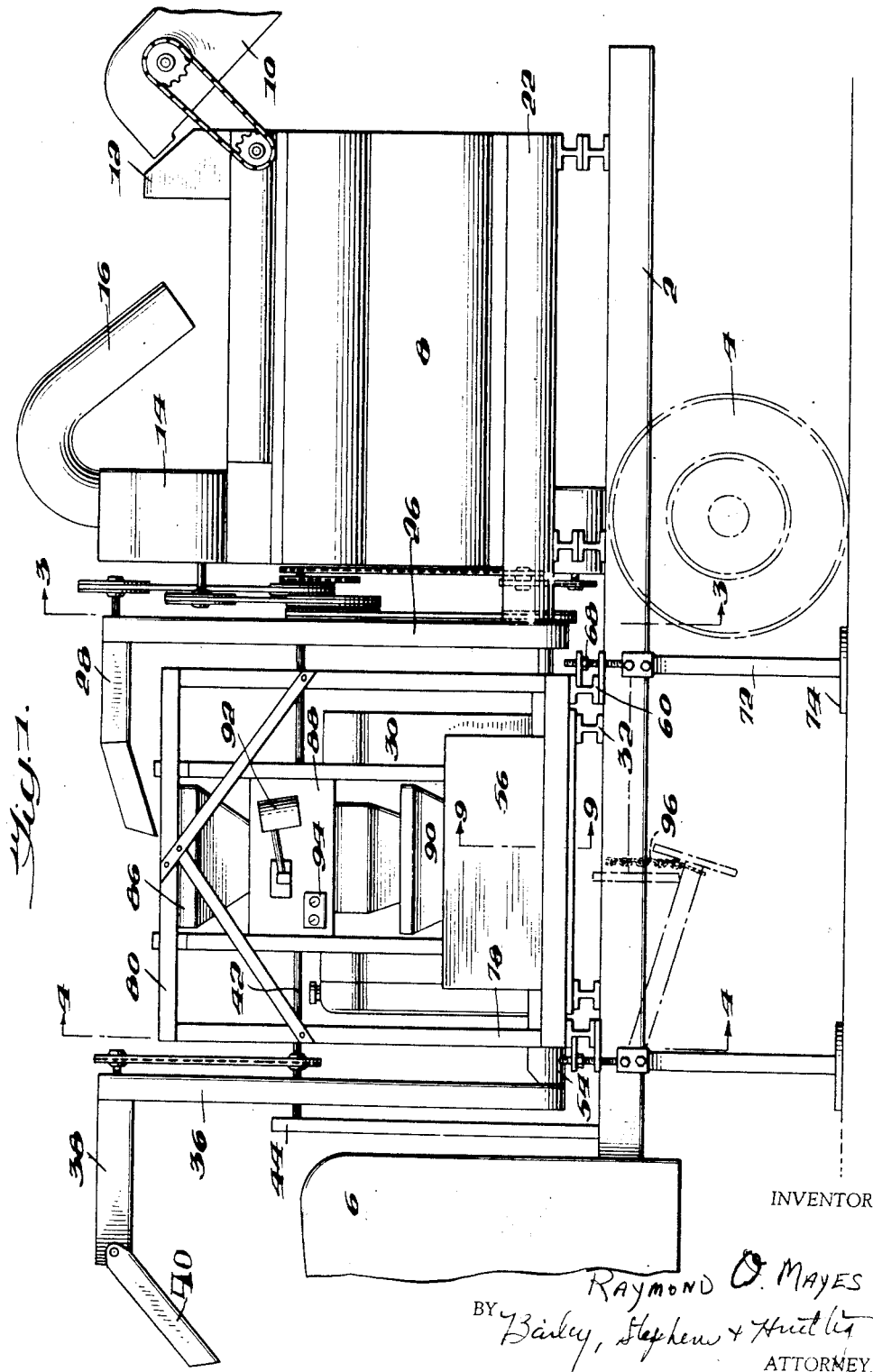

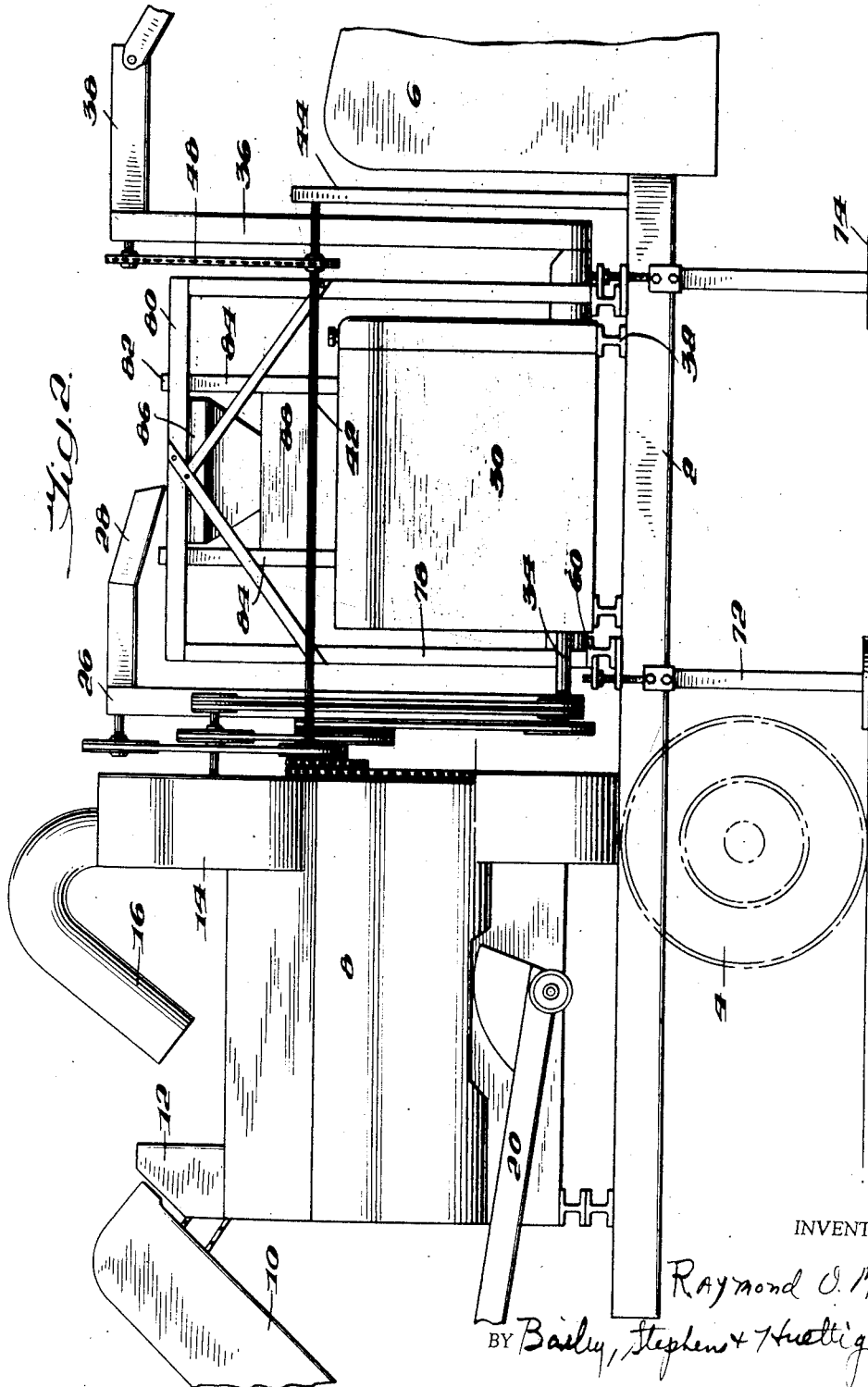

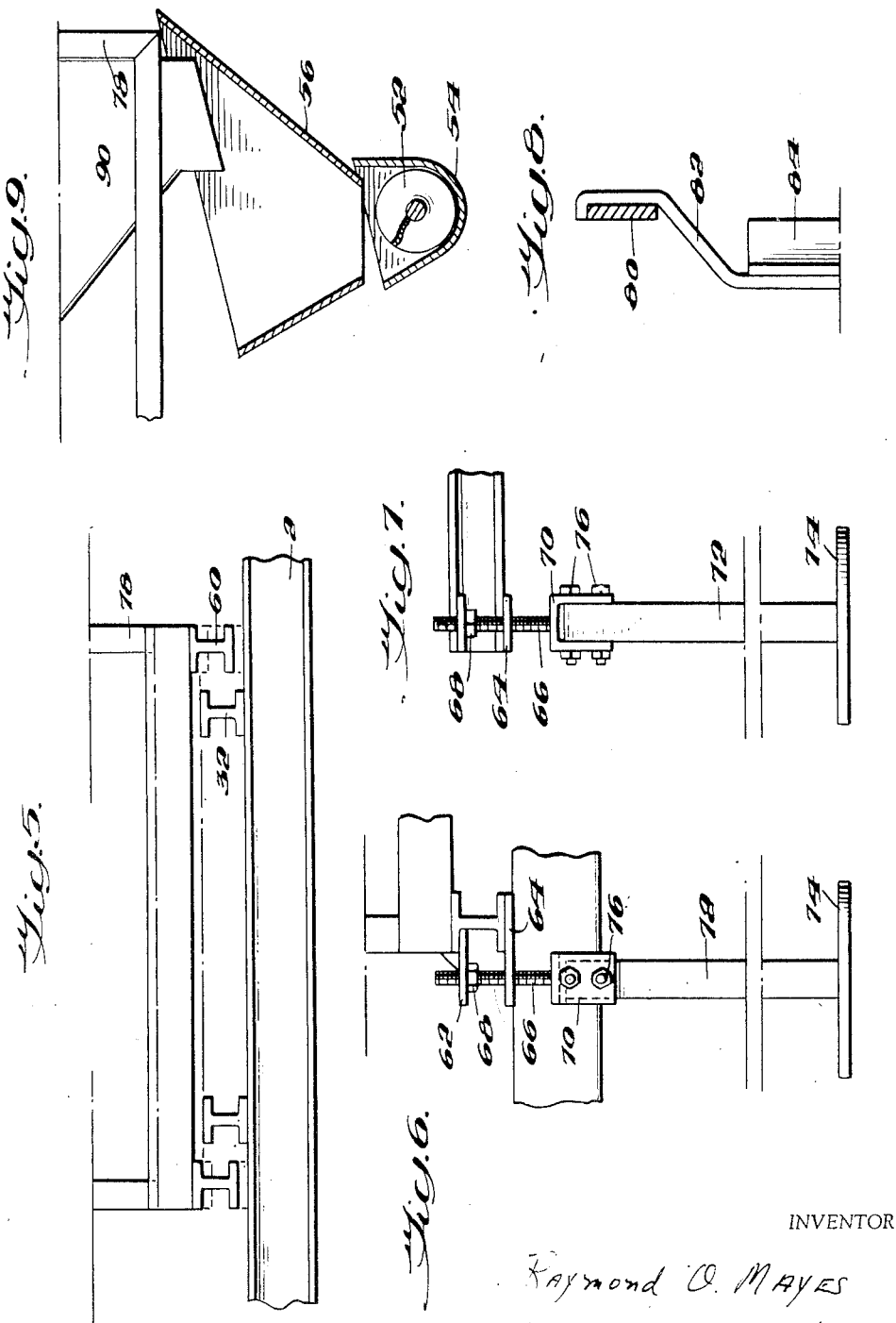

United States Patent Office 2,700,388
Patented Jan. 25, 1955

2,700,388

CORN SHELLING AND MEASURING DEVICE

Raymond O. Mayes, Petersburg, Va.

Application June 19, 1953, Serial No. 362,728

4 Claims. (Cl. 130—6)

The invention relates to a corn shelling and measuring device, and more particularly to a device of this nature which is portable in character.

In the past, it has been the practice for the purchaser of corn from the farmer to shell the corn from the cobs at the farm, and to measure this corn by bagging it and weighing it as it is shelled, before putting it in a vehicle for transportation. This has required the services of a number of workers for the bagging and weighing, the handling also increasing the time required for getting the corn into the truck.

In some instances also the corn has been shelled into the truck and then removed elsewhere for weighing. This has the disadvantage that it must be removed from the truck as it is weighed, and also that the farmer himself who sells the corn must rely on the honesty of the purchaser or sheller in giving him the correct weight.

The primary object of the present invention is to provide an apparatus by which corn can be shelled and weighed at the farm in the presence of the owner, by an apparatus which keeps an accurate record of the amount of corn shelled and dispenses it directly into a truck or other form of transportation.

Corn weighing devices are in themselves well known, but they are subject to the disadvantage that accurate weighing is impossible if the scales or weighing device are subjected to vibrations during the weighing operation. It is impractical therefore to mount the scales directly on a vehicle which also has any arrangement for shelling the corn and transferring the weighed corn to a truck or the like.

According to the present invention, a corn measuring or weighing device is carried by a vehicle which also carries the corn sheller and the conveyors for loading the shelled and weighed corn into a truck, but is so mounted that when in use it can be rendered independent of any vibrations from the shelling and transporting machinery.

More particularly, the invention contemplates the mounting of a corn measuring or weighing device on a truck in such a way that it can, by suitable mechanism, be lifted out of contact with the truck when the truck is stationary and the corn shelling apparatus is in use. The weighing device is so positioned and arranged that, while it receives shelled corn from the sheller and dispenses the shelled corn to a conveyor which carries it off to a truck or the like, the weighing apparatus is completely out of contact both with the driving mechanism and with the transporting mechanism.

With such an arrangement, corn can be accurately weighed as it comes from the sheller, and dispensed into a truck, without requiring the labor of bagging or mechanical weighing which has heretofore been necessary. At the same time, the farmer can check the amount of corn delivered into the truck by a counting mechanism carried by the weighing device.

Further objects and advantages of the invention will appear more fully from the following description, particularly when taken in conjunction with the accompanying drawings which form a part thereof.

In the drawings:

Fig. 1 shows in side elevation a corn shelling and measuring device embodying my invention;

Fig. 2 is a similar view from the other side;

Figs. 3 and 4 are cross-sections, on the lines 3—3 and 4—4 respectively, of Fig. 1;

Fig. 5 is an explanatory side elevation of parts of the device on an enlarged scale;

Fig. 6 shows in side elevation one of the lifting jacks;

Fig. 7 is a front view of a part of this jack;

Fig. 8 is a detail of the mounting of the weighing device; and

Fig. 9 is a section substantially on the line 9—9 of Fig. 1.

The arrangement as shown in this application is intended to be mounted on a conventional heavy truck having longitudinal chassis members 2, wheels 4 and a cab 6. Mounted on the rear end of the chassis is a conventional corn sheller 8, the details of which form no part of the present invention. The sheller however includes a conveyor 10 for raising corn cobs to a hopper 12 which feeds them into the shelling arrangement. The corn husks are discharged by a blower 14 through a spout 16 and the shelled cobs are discharged through part 18 to a conveyor 20 which carries them away from the machine. The shelled corn is discharged into a casing 22 in which is a screw conveyor 24.

The conveyor 24 carries the shelled corn to an elevator 26 which lifts it and discharges it through a spout 28. This whole arrangement is driven by a motor 30 mounted on I-beams 32 extending transversely and secured on the longitudinal chassis members 2. Motor shaft 34 through the arrangement shown in Fig. 3 drives the various parts of the sheller in a conventional manner.

Mounted towards the forward end of the truck is a second elevator 36 having a discharge arrangement 38, having a hinged end 40 which is positioned to discharge into a second truck adjacent the truck on which the shelling arrangement is mounted. The motor shaft 34 drives among others a shaft 42, which extends forwardly from the vicinity of the sheller and has its front end mounted in a frame 44 on the chassis members 2. This shaft by pulleys connected through belt 48 drives the front elevator 36.

It will be noted that the motor, as shown in Fig. 4, is mounted to one side of the longitudinal central plane of the vehicle, so that a space is left between the two elevators 26 and 36.

Elevator 36 is fed by a screw conveyor 52 mounted in a case 54 and fed by a hopper 56. Hopper 56 is supported by a frame 58 mounted on the transverse I-beams 32.

Extending transversely of the vehicle on either side of I-beams 32 are I-beams 60, which are adapted to rest on but are not permanently secured to the longitudinal chassis members 2. These I-beams 60 have at each end outward extensions 62, 64, having holes through which extend bolts 66 provided with nuts 68 engaging the underside of members 62. Bolts 66 are secured in U-shaped members 70 which engage over the tops of posts 72 having at their lower ends ground engaging portions 74. Parts 70 are releasably secured on posts 72 by releasable bolts or pins 76.

Mounted on I-beams 60 is a frame 78 including vertical members and upper horizontal cross-members 80. Hangers 82 (Fig. 8) support a second frame 84 on members 80, and this frame carries a corn measuring or weighing device of conventional nature, including a receiving hopper 86, a weighing mechanism 88 and a discharge hopper 90. Weight 92 serves to weigh successive equal amounts of corn and register 94 indicates the number of units of weight which have passed through the weighing device. The details of this weighing device are well known, and form no part of the present invention.

As shown in Fig. 1, the spout 28 of the first elevator 26 is positioned to discharge shelled corn into the hopper 86, but is entirely out of contact therewith. Also, as shown in Fig. 9, the discharge hopper 90 of the corn weighing device discharges into hopper 56, but is also completely out of contact therewith. Hoppers 56 and 86 are of such dimension longitudinally of the vehicle that the frame 78 can be shifted somewhat along the chassis without interfering with the flow of shelled corn.

With such an arrangement, when the machine is being transported, the I-beams 60 are allowed to rest on the longitudinal chassis members 2. The posts 72 are not connected in position, but are carried on the truck in a suitable place, or, by removing one of pins 76, may be swung up to the broken line position shown in Fig.

1 and held by a chain 96. Thus the whole arrangement can be easily transported from place to place.

When the device reaches the point on the farm at which corn is to be shelled, it is backed up into a suitable position so that elevator 10 can receive the corn from the crib. Another truck is positioned to receive shelled corn from spout 40. Posts 72 are secured in members 70, and nuts 68 are turned in such a way as to lift the I-beams 60 off the longitudinal chassis members 2 from a distance sufficient to prevent danger that vibrations of the truck body will be transferred to the frame 78.

Motor 30 is now started, and the corn sheller begins to operate. Ears of corn are fed to the conveyor 10, and are shelled in the sheller, which discharges the husks at 16 and the shelled cobs at 20. The shelled corn is dropped into conveyor 24, fed to elevator 26 and conveyed through spout 28 to hopper 86. At periodic intervals, as a unit weight of corn has been weighed, this will be dumped through hopper 90 into hopper 56 and fed by conveyor 52 to elevator 36 and through spout 40 to the receiving truck. The amount of corn shelled will be indicated on register 94.

When all the corn has been shelled, or when the device is to be moved, nuts 68 are threaded so as to let the I-beams down to the broken line position shown in Fig. 5, in which they rest on the chassis members 2. Posts 72 are then released from part 70, and the device is ready for transportation.

As a result of this arrangement, it has been possible with the labor of four men to shell and weigh as much as 775 bushels of corn per hour, thus enabling the user of the device to make substantial savings in labor costs.

While I have described herein one embodiment of my invention, I wish it to be understood that I do not intend to limit myself thereby except within the scope of the claims hereto or hereinafter appended.

I claim:
1. A corn measuring device comprising a mobile frame having thereon a corn sheller having a discharge means, and a shelled corn loader having a corn receiving means, said frame having adjacent said sheller and loader a space, a corn measuring device in said space having ground supports independent of said mobile frame, said measuring device having corn receiving means and corn delivery means, in cooperative detached relationship with said discharge means and said receiving means respectively, whereby said shelled corn measuring means is unaffected by vibrations set up by said corn sheller and said corn loader.

2. A device as claimed in claim 1 in which said supports are adjustable to lower the measuring device onto the frame for transportation thereon.

3. A device as claimed in claim 1 in which said measuring device is located between the corn sheller and the loader.

4. A device as claimed in claim 1 including a motor mounted on said frame and connected to the corn sheller and loader to drive the same.

References Cited in the file of this patent
UNITED STATES PATENTS

| | | |
|---|---|---|
| 1,303,854 | Clark | May 20, 1919 |
| 1,783,423 | Harper | Dec. 2, 1930 |
| 2,101,561 | Rapp | Dec. 7, 1937 |
| 2,306,754 | Ronning | Dec. 29, 1942 |
| 2,443,031 | Gerber | June 8, 1948 |
| 2,658,604 | Erdmenger et al. | Nov. 10, 1953 |
| 2,670,921 | Dodd et al. | Mar. 2, 1954 |